May 5, 1953     O. M. BURKHARDT     2,637,463
COOKING UTENSIL
Filed July 2, 1948
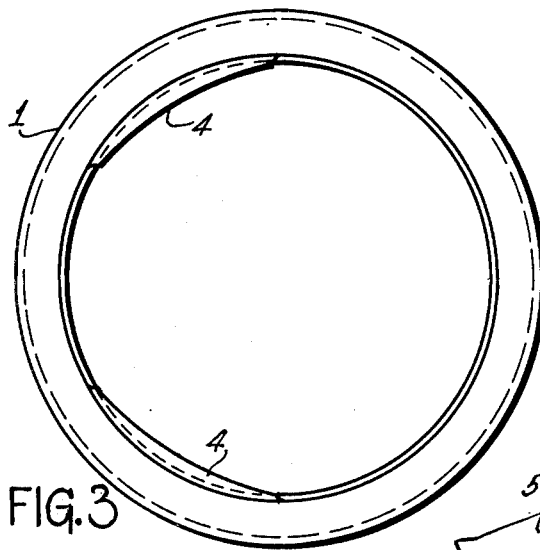
FIG. 3
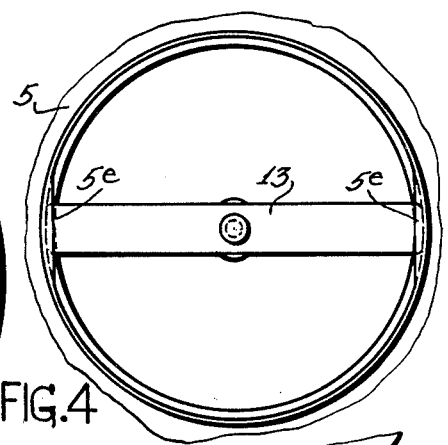
FIG. 4
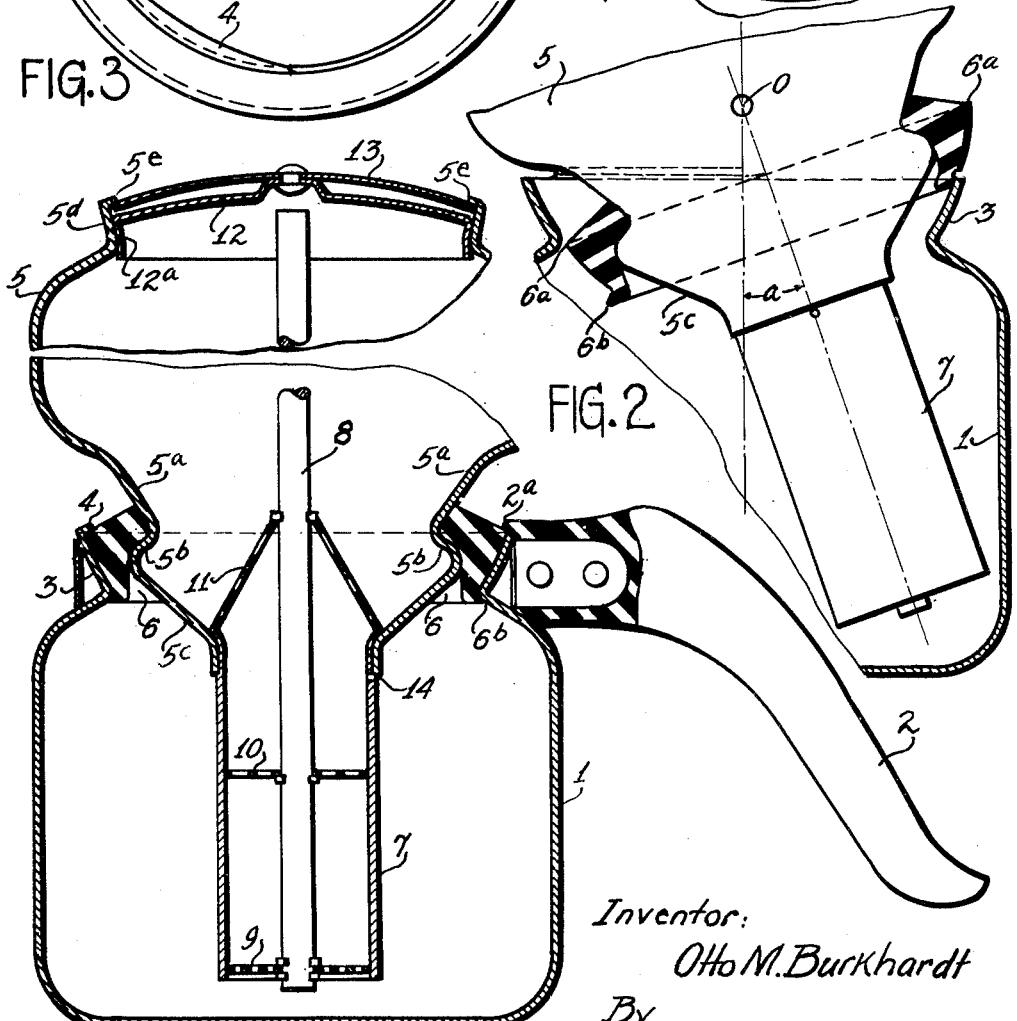
FIG. 2
FIG. 1
Inventor:
Otto M. Burkhardt
By Milburn Milburn
Attorneys Patented May 5, 1953

2,637,463

UNITED STATES PATENT OFFICE 2,637,463

COOKING UTENSIL

Otto M. Burkhardt, Euclid, Ohio

Application July 2, 1948, Serial No. 36,675

2 Claims. (Cl. 220—46)

This invention pertains to the art of pressure cookers and is related to my co-pending application Serial No. 748,377, filed May 16, 1947. As in the co-pending application, so here also the general purpose is to devise an improved form of pressure cooker that is peculiarly well adapted for the preparation of coffee.

The main object of my present invention is to devise means for brewing coffee by segregating the coarser particles of the ground coffee beans from the finer particles and by subjecting the former to an infusion intensified by considerable agitation which is induced by steam and water while the latter are subjected to a proportionately milder infusion.

Another object is to devise a hermetically sealed unitary utensil which is peculiarly well adapted for carrying out this combined treatment of the coarser and finer particles of the ground coffee in one combined operation so as to thereby obtain the optimum flavor of the coffee and also expedite the performance of the brewing operation.

Another object is to provide such a utensil with an opening for easy access to the interior thereof and with means for closing this opening in such manner as to withstand a predetermined amount of internal pressure and to permit the ready escape of any internal pressure above the predetermined amount.

Another object is to devise such a utensil which comprises a container with upper and lower parts and an improved means of hermetic sealing engagement between the same.

Other objects will appear from the following description and claims when considered together with the accompanying drawing.

Fig. 1 is a vertical sectional view of my present improved utensil for preparing coffee;

Fig. 2 is a partial view illustrating the manner in which the upper part of the utensil is brought into sealing engagement with the lower part;

Fig. 3 is a top plan view of the lower part of the utensil; and

Fig. 4 is a top plan view of the upper part of the utensil.

It is to be understood that the present form of disclosure is merely for the purpose of illustration and that there might be devised various modifications thereof without departing from the spirit of my invention as herein set forth and claimed.

Roasted coffee beans contain oils which range in volatility from that of ether to the viscosity of varnish or resin. During the brewing of the beverage, hot water of less than boiling temperature suffices to extract the volatile oil from the coffee but not the viscous oils. This condition can be improved somewhat by grinding the coffee beans and research has shown that the best results can be obtained only if the coarser particles of the ground coffee are subjected to steam preferably under some pressure for the purpose of penetrating the cells of the coffee particles to dissolve the oils and if such particles are subjected simultaneously to considerable agitation and washing. The finer particles of the ground coffee, however, should be subjected to a much gentler infusion lest not only the volatile and the viscous oils will be infused into the brew but also the pulp of the coffee bean itself, which would give a muddy taste to the beverage.

Pressure cookery normally provides steam at temperatures higher than the boiling point and the present embodiment of my invention is so conceived and designed as to utilize steam and water for purposes of penetration, dissolution, agitation and washing of the coarser particles and, at the same time, to provide a milder treatment for infusion of the finer coffee particles.

In the present embodiment of my invention, the lower container 1 is shown with a flat bottom adapted to be set over the source of heat and is provided with a somewhat constricted opening at the top thereof. This container has a handle 2 and the upper edge portion thereof has an upwardly and outwardly inclined flange 3 thereabout. At one or more points of its circumference the flange 3 is provided with inwardly extending rigid projections 4, integral with the flange 3. In the present illustration, there are two such projections which are spaced approximately one hundred and twenty (120) degrees apart and are so located as to leave an unobstructed portion, opposite the handle 2, for pouring the brewed coffee from the lower container. As indicated in Fig. 3 hereof, these two projections 4 are of duplicate form and are of substantially crescent shape, with their greatest width at the middle thereof and with their two ends merging into the edge of the flange 3. The inner end of the handle 2, which may be made of hard rubber or the like, may be provided with an inward projection 2a so located with respect to the projections 4 that they will all three be spaced equi-distant about the circumference of the container opening. Or, the projection 2a may be of resilient rubber or other resilient form for a purpose to be hereinafter explained.

The inner surface of the flange 3 is of slightly concave spherical, that is truncated-spherical, form so as to facilitate the application of the upper container 5 thereto. In passing, it might be noted that the upper part of the container 5 is of substantially the same diameter as that of the lower container 1 but the lower part of the upper container is of reduced form and there is an intermediate downwardly and inwardly inclined portion 5a and an annular outwardly, downwardly inclined shoulder portion 5b, these portions 5a and 5b together forming a seat within which is applied and held the correspondingly formed sealing ring 6 of resilient rubber or the like for effecting sealing engagement between the lower and upper containers 1 and 5. This gasket has an upper outer edge portion 6a which is adapted for insertion beneath the projections 4, as the initial step in assembling the two containers; following which, the edge portion 6a of the gasket is adapted to be engaged in a downwardly swinging motion beneath the projection 2a at the inner end of the handle 2. The entire handle 2 may be made of hard rubber or the like and the resilience of the gasket 6 may be relied upon entirely for permitting engagement of the same beneath the projection 2a.

It should be here explained that the lower portion 5c of the upper container has depending from the center thereof the cylindrical chamber 7 which is adapted to have its lower end spaced from the bottom of the lower container 1 when the parts are in complete assembly, as indicated in the drawing. The chamber 7 is of substantially less diameter than that of the wall of the lower container so that there is ample space between the walls of the lower container and the chamber 7. Within the chamber 7 there is provided a filtering means. Attached to the lower end of a vertical rod 8 is a disk 9 with very fine perforations; farther up on the same rod 8 is located another disk 10 with larger perforations; and still farther up on the rod 8 there is located the perforated conical disk 11 which is provided with still larger holes. The lower edge of disk 11 may rest upon the portion 5c of the upper container and its upper edge may be engaged by projection means upon the rod 8 which extends therethrough and upon which the disk 9 is mounted. The intermediate disk 10 may also rest upon suitable projection means upon the rod 8. The rod 8 and the several perforated disks 9, 10 and 11 may be recognized as a filter unit which may be readily placed in the position indicated in the drawing and as readily removed therefrom for the purpose of cleaning. It is to be noted that the holes in the lower disk 9 are of substantially smaller size than those in the disks 10 and 11, this being for a purpose to be hereinafter explained.

The top part of the upper container 5 is of restricted form and is provided with an upwardly and outwardly extending annular flange or shoulder 5d which has the diametrically arranged inwardly extending ledges 5e. The closure 12 has a downwardly extending annular flange 12a which is adapted to have seating engagement upon the shoulder 5a for effectively closing the upper container 5; and the spring 13 has its ends adapted for engagement beneath the lips 5b so as to hold the closure 12 in effective engagement. These parts are so constructed and arranged that, in the event of excessive pressure within the utensil, spring 13 will yield to the extent of permitting slight upward movement of the closure 12 so as to permit escape of such excess internal pressure. Thus there is provided an automatically actuated means of relief of such pressure.

In assemblying the parts of this device, the lower end of the upper container including the chamber 7 will be inserted into the lower container, as indicated in Fig. 2 hereof; then, by swinging the upper part of the device about the point "O," which is the center of the curvature of the concave spherical portion of the mouth of the lower container, the gasket already applied to the upper container may be brought into effective seating engagement with the correspondingly formed spherical surface of the seat upon the lower container. It will be observed that there is allowed sufficient clearance, with respect to the most inwardly located point of each of the ledges 4, to permit the application of the upper part of the utensil in such manner as to bring the sealing gasket into its full seating engagement with the companion seat upon the lower container, as herein described.

To explain more fully, in the process of assemblying the upper and lower containers, the upper container 5 is tilted relatively to the lower container 1 and, in such position, is inserted in the manner indicated in Fig. 2 of the present drawing. It will be noted that the edge 6a of the sealing gasket 6 extends below the projections 4 while the spherical surface of the sealing ring 6 rests at least partly upon the coacting spherical sealing surface 3 of the lower container. With the parts in this condition, it is necessary only to swing the upper container 5 through an angle "a" in order for the two containers 1 and 5 to be sealed together, with the edge 6a pressing upwardly beneath the projections 4. The edge 6a of the gasket may at the same time be brought into engagement beneath the projection 2a. When the upper container is swung into sealing position upon the lower container, the lower annular lip portion 6b of the sealing ring 6 also engages the lower edge of the flange 3 so that any pressure within the utensil will expand the lip portion 6b into even tighter sealing engagement with the neck portion of the container 1. This, in addition to the projections, will serve to hold the upper and lower containers together even if there be pressure within the utensil. In this connection it should be stated that the lower lip 6b will seal tighter and tighter as the internal pressure rises, while the spherical form of seal is rather for the purpose of properly locating the two containers relatively to each other and for bringing the projections as well as the lip 6b into functioning relationship.

When the two containers are assembled and water is added, then the ground coffee may be placed in the upper container. Some of the coffee may fall through the upper perforated disk 11 and some may fall through the disk 10 but not through the bottom disk 9 as its perforations are too fine to permit this. Experience shows that nearly all of the ground coffee will remain above the upper disk 11 when it is first placed thereupon.

The combined utensil with the water and ground coffee may then be placed over a source of heat. At about 175 degrees Fahrenheit, vapor of slightly higher pressure than that of the atmosphere will commence to gather above the surface of the water. In order to prevent accumulation of pressure in the lower container, which would force the water into the upper container long before the boiling point is reached, there is provided a vent 14 opening into the upper part of chamber 7. When the boiling point of the water in the lower container has been reached, steam is generated much faster than before, so that vent 14 becomes entirely inadequate; consequently pressure is built up in the container 1 and the water is forced up through the bottom of chamber 7 and the filtering unit into upper container 5. When enough water has been forced out of the lower container 1 to expose the lower open end of chamber 7, then the steam will rise directly, leaving that portion of the water below the lower end of chamber 7 available for evaporation.

The steam rising through chamber 7 causes considerable agitation. Meanwhile the coffee in the upper container has become soaked with water and the larger particles of the ground coffee, tossed about by the rising steam, gravitate downwardly through the holes of the disks 10 and 11 but not through the disk 9. Now the rising steam not only agitates the water in the tube and the coffee floating therein but it serves also to blow upwardly all the finer particles of the ground coffee. Because of this, the coarse particles only will remain within the chamber 7 while the finer particles are blown upward above the surface of the water. In this way, the coarse particles will not only lodge where the steam and water are hottest, but they are penetrated by the steam and they are washed by the agitation, all of which promotes the infusion of the water by the oils of the coffee.

The finer particles of the ground coffee are caused to float upon the surface of the water in the upper container or are driven to the walls of the upper container where there is proportionately less agitation and washing, and where there is afforded an infusion that is duly proportional to the weight of the coffee particles. More than this, not only is most of the coffee submerged in water and hence not exposed to air, but even that which floats upon the surface of the water can not come in contact with the atmosphere. Obviously with the atmosphere excluded, there is much less oxidation and the natural flavor of the coffee is preserved.

During the performance of this process, the particles of the ground coffee become segregated and practically all if not all of the coarse particles will be confined within the chamber 7 while the finer particles will be in the upper container. The centrally located chamber 7 serves to create a vortex with the steam blowing up therethrough; and this phenomenon serves to promote the operation herein described.

When the brewing action has been completed and the utensil has been removed from the source of heat, the liquid will filter from the upper container through the perforated disks and chamber 7 into the lower container. The coarser particles of the ground coffee will settle and rest upon the disk or disks within chamber 7 and will constitute an effective filter for further infusion of the natural coffee flavor into the liquid as it passes down therethrough. This filtering process is induced primarily by gravity and is assisted appreciably by a partial vacuum which has developed in the lower container due to condensation and contraction. The coarser particles of the ground coffee will serve also as a means of catching and holding the finer particles which might gravitate into the chamber 7 and thus the filtering action will be rendered even more effective, although practically all of the finer particles will have been retained in the upper part of the utensil in the region beyond the conical disk 11. Thus the retention of the coarser particles of the coffee grounds within the chamber 7 will serve to doubly enrich the liquid with the natural flavor of the coffee by virtue of the brewing action which takes place within this chamber during the cooking operation and the later filtering action which takes place after the cooking operation has been terminated. Any of the finer particles of the ground coffee which might find their way through the other accumulated particles within the chamber 7, will be prevented practically entirely from passing through the finer perforations of the bottom disk 8 and thus the resulting beverage will be practically free of any sediment.

With my present process, the coarser particles of the ground coffee will be subjected to the more violent action of the boiling water within the chamber 7 where such coarser particles will be washed by the steam and boiling water so as to ensure dissolution of the natural flavor of the coffee therefrom while at the same time the finer particles of the ground coffee are being subjected to the proper degree of infusion in the upper part of the utensil. Thus there is accomplished automatically a segregation of the coarser particles and the finer particles in such manner that they might be given their necessary treatment for the removal of the natural flavor therefrom in the most efficient manner. That is to say, this treatment by segregation is the means of obtaining a very high degree of the natural flavor with sufficient but not excessive processing, thereby obtaining the most desirable quality without any undesirable quality in the resulting beverage.

The filtering through a very considerable depth of coffee grounds, as above described, is made possible only by having the finer particles segregated and deposited where they can not clog the filtering medium, as would otherwise be the case except for my present improved process.

Upon removal of the upper container and chamber 7 from the lower part of the utensil in essentially the reverse manner from that above described, the coffee may then be readily dispensed from the lower container.

The ready removal of the disks 9, 10 and 11 and their rod 8 from the chamber 7, permits cleaning of the same in a most convenient manner, as well as the rest of the device.

Another advantage consists in the fact that this utensil may be manufactured and sold at a comparatively low price.

The primary advantage of this device, in spite of its comparatively simple structure and low cost, consists in effecting a balanced treatment of the coarser and finer particles of the ground coffee in such manner as to prevent the finer particles from being cooked to excess and at the same time to ensure maximum extraction of the desired flavor of the coffee and without any undesirable results. The performance of this process in an efficient manner is made possible by carrying it out in a hermetically sealed utensil, whereby there is retained the maximum of the natural coffee flavor and there is precluded the objectionable oxidation, which occurs in the presence of air and which is detrimental to the flavor of the resulting beverage. Another advantage of performing the brewing action within a hermetically sealed container, resides in the fact that the temperature of the water may be raised to a point above atmospheric boiling point, which ensures speedier extraction of the natural flavoring compounds from the coarser particles of the ground coffee, since increased pressure speeds up the soaking of the coarser particles of the coffee and ensures more active agitation of the same within the liquid. Equally important is the fact that in the conventional vacuum type of coffee maker, the water in the upper bowl never reaches the boiling point because the steam, instead of heating the water, is free to pass into the atmosphere in large bubbles without heating the water. Furthermore, this induces oxidation which is objectionable, as above noted.

Thus I have devised a comparatively simple and inexpensive utensil which is capable of accomplishing in a comparatively short time the brewing of coffee with an optimum of the natural flavor but with a minimum of undesirable quality.

What I claim is:

1. A cooking utensil, comprising a container having an open top with a downwardly and inwardly inclined annular shoulder, the inner surface of said shoulder being of concave form throughout the entire height thereof and corresponding to a section of a sphere, there being located at the upper edge of said shoulder a plurality of inward projecting means located in diametrically opposite regions, and a closure having an annular resilient sealing means projecting radially therefrom for successive engagement beneath said projecting means respectively, and the outer surface of said sealing means being of spherical form adapted for effective engagement with the spherical inner surface of said shoulder.

2. A cooking utensil, comprising a container having an open top with a downwardly and inwardly inclined annular shoulder, the inner surface of said shoulder being of concave form throughout the entire height thereof and corresponding to a section of a sphere, the upper edge of said shoulder having a plurality of rigid inward projections and another projection all located approximately equi-distant apart from each other, and a closure having an annular resilient sealing gasket projecting radially therefrom for successive engagement beneath said rigid projections and said other projection, respectively, the outer surface of said sealing means being of spherical form adapted for effective engagement with the spherical inner surface of said shoulder.

OTTO M. BURKHARDT.

References Cited in the file of this patent

UNITED STATES PATENTS

| Number | Name | Date |
|---|---|---|
| Re. 1,656 | Ludlow | Apr. 19, 1864 |
| 51,264 | Niles | Nov. 28, 1865 |
| 90,159 | Erskine | May 18, 1869 |
| 414,596 | Shobe | Nov. 5, 1889 |
| 1,790,957 | Sykes | Feb. 3, 1931 |
| 2,223,450 | Jepson et al. | Dec. 3, 1940 |
| 2,265,615 | Stalter | Dec. 9, 1941 |
| 2,284,359 | Bellows | May 26, 1942 |
| 2,314,543 | Kopf | Mar. 23, 1943 |
| 2,346,924 | Lekmann | Apr. 18, 1944 |
| 2,404,539 | Schmidt | July 23, 1946 |
| 2,470,323 | Smith | May 17, 1949 |
| 2,513,594 | Snyder | July 4, 1950 |